US009417464B2

(12) United States Patent
Wildsmith et al.

(10) Patent No.: US 9,417,464 B2
(45) Date of Patent: *Aug. 16, 2016

(54) METHOD AND APPARATUS OF FORMING A TRANSLATING MULTIFOCAL CONTACT LENS HAVING A LOWER-LID CONTACT SURFACE

(71) Applicant: Johnson & Johnson Vision Care, Inc., Jacksonville, FL (US)

(72) Inventors: Christopher Wildsmith, Jacksonville, FL (US); Michael Widman, Jacksonville, FL (US); Jonathan P. Adams, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,896

(22) Filed: Apr. 1, 2013

(65) Prior Publication Data

US 2014/0063446 A1    Mar. 6, 2014

Related U.S. Application Data

(63) Continuation-in-part of application No. 12/195,132, filed on Aug. 20, 2008, now Pat. No. 8,318,055, which is a continuation-in-part of application No. 12/194,981, filed on Aug. 20, 2008, now Pat. No. 8,317,505.

(60) Provisional application No. 61/618,022, filed on Mar. 30, 2012.

(51) Int. Cl.
*G02C 7/04* (2006.01)
*B29D 11/00* (2006.01)
*B29C 35/08* (2006.01)

(52) U.S. Cl.
CPC .......... *G02C 7/043* (2013.01); *B29D 11/00028* (2013.01); *B29D 11/00057* (2013.01);
(Continued)

(58) Field of Classification Search
CPC .......... G02C 7/041; G02C 7/043; G02C 7/048
USPC ...................................... 351/159.19, 159.36
See application file for complete search history.

(56) References Cited

U.S. PATENT DOCUMENTS

| 3,658,528 A | 4/1972 | Berman |
| 3,916,033 A | 10/1975 | Merrill |

(Continued)

FOREIGN PATENT DOCUMENTS

| EP | 0207640 A2 | 1/1987 |
| EP | 322353 | 6/1989 |

(Continued)

OTHER PUBLICATIONS

European Search Report dated Jul. 9, 2013 for corresponding Patent Application No. 13161807.

(Continued)

*Primary Examiner* — Darryl J Collins

(57) ABSTRACT

The present invention discloses a translating multifocal contact lens including one or both of multiple Optic Zones and a lower-lid contact surface, and method steps and apparatus for implementing the same. In preferred embodiments, a translating multifocal lens may be Free-formed comprising a lower-lid contact surface capable of limiting the amount of translation of a lens across a surface of an eye when an eye changes from one Optic Zone to another.

10 Claims, 6 Drawing Sheets

(52) U.S. Cl.
CPC .... *B29D11/00442* (2013.01); *B29D 11/00961* (2013.01); *B29C 35/0888* (2013.01); *B29C 2035/0833* (2013.01)

(56) References Cited

U.S. PATENT DOCUMENTS

| | | | |
|---|---|---|---|
| 4,701,288 A | 10/1987 | Cook | |
| 4,702,574 A | 10/1987 | Bawa | |
| 4,813,777 A * | 3/1989 | Rainville et al. | 351/159.41 |
| 4,988,274 A | 1/1991 | Kenmochi | |
| 5,114,628 A | 5/1992 | Hofer | |
| 5,166,710 A | 11/1992 | Hofer | |
| 5,182,056 A | 1/1993 | Spence | |
| 5,200,121 A | 4/1993 | Hagmann | |
| 5,219,497 A | 6/1993 | Blum | |
| 5,396,045 A | 3/1995 | Opdyke | |
| 5,452,031 A | 9/1995 | Ducharme | |
| 5,462,700 A | 10/1995 | Beeson | |
| 5,502,518 A | 3/1996 | Lieberman | |
| 5,517,260 A | 5/1996 | Glady | |
| 5,650,837 A | 7/1997 | Roffman | |
| 5,662,706 A | 9/1997 | Legerton | |
| 5,685,420 A | 11/1997 | Martin | |
| 5,730,911 A | 3/1998 | Cano | |
| 5,782,460 A | 7/1998 | Kretzschmar et al. | |
| 5,983,201 A | 11/1999 | Fay | |
| 6,086,204 A | 7/2000 | Magnante | |
| 6,142,628 A | 11/2000 | Saigo | |
| 6,145,988 A | 11/2000 | Manfredini | |
| 6,200,646 B1 | 3/2001 | Neckers | |
| 6,217,171 B1 * | 4/2001 | Auten et al. | 351/159.02 |
| 6,233,102 B1 | 5/2001 | Hogan, Jr. | |
| 6,241,355 B1 | 6/2001 | Barsky | |
| 6,305,802 B1 | 10/2001 | Roffman | |
| 6,340,229 B1 | 1/2002 | Lieberman | |
| 6,413,251 B1 | 7/2002 | Williams | |
| 6,457,826 B1 | 10/2002 | Lett | |
| 6,471,891 B1 | 10/2002 | Cameron | |
| 6,499,843 B1 | 12/2002 | Cox | |
| 6,520,958 B1 | 2/2003 | Shimmick | |
| 6,595,639 B1 | 7/2003 | Ho | |
| 6,598,975 B2 | 7/2003 | Liang | |
| 6,616,275 B1 | 9/2003 | Dick | |
| 6,626,534 B1 | 9/2003 | DiMartino | |
| 6,800,225 B1 | 10/2004 | Hagmann et al. | |
| 6,827,885 B2 | 12/2004 | Altmann et al. | |
| 6,842,223 B2 | 1/2005 | Tyminski | |
| 6,935,743 B2 | 8/2005 | Shadduck | |
| 6,966,649 B2 | 11/2005 | Shadduck | |
| 6,997,428 B1 | 2/2006 | Andino et al. | |
| 7,029,119 B2 | 4/2006 | Youssefi | |
| 7,128,866 B1 | 10/2006 | Henningsen | |
| 7,172,285 B1 | 2/2007 | Altmann | |
| 7,235,195 B2 | 6/2007 | Andino et al. | |
| 7,293,871 B2 | 11/2007 | Dreher | |
| 7,350,920 B2 | 4/2008 | Levine | |
| 7,384,146 B2 | 6/2008 | Covannon | |
| 7,431,454 B2 | 10/2008 | Hofmann et al. | |
| 7,860,594 B2 | 12/2010 | Andino et al. | |
| 7,905,594 B2 | 3/2011 | Widman | |
| 8,317,505 B2 | 11/2012 | Widman et al. | |
| 8,318,055 B2 | 11/2012 | Widman et al. | |
| 2001/0047217 A1 | 11/2001 | Buazza et al. | |
| 2002/0024631 A1 | 2/2002 | Roffman | |
| 2002/0071094 A1 | 6/2002 | Roffman | |
| 2002/0071097 A1 | 6/2002 | Ross | |
| 2002/0140902 A1 | 10/2002 | Guirao | |
| 2002/0154271 A1 | 10/2002 | Donitzky | |
| 2003/0003295 A1 | 1/2003 | Dreher | |
| 2003/0007123 A1 | 1/2003 | Broderick | |
| 2003/0030161 A1 | 2/2003 | Pegram | |
| 2003/0053031 A1 | 3/2003 | Wirth | |
| 2003/0095231 A1 * | 5/2003 | Ezekiel | 351/161 |
| 2003/0117580 A1 | 6/2003 | Franz | |
| 2003/0128336 A1 | 7/2003 | Jethmalani | |
| 2003/0142267 A1 | 7/2003 | Gemert et al. | |
| 2004/0004287 A1 | 1/2004 | Shimizu et al. | |
| 2004/0015261 A1 | 1/2004 | Hofmann | |
| 2004/0017542 A1 | 1/2004 | Lindacher et al. | |
| 2004/0041287 A1 | 3/2004 | Engardio | |
| 2004/0046287 A1 | 3/2004 | Andino | |
| 2004/0046931 A1 | 3/2004 | Legerton | |
| 2004/0054358 A1 | 3/2004 | Cox | |
| 2004/0064376 A1 | 4/2004 | Yoshida | |
| 2004/0100619 A1 | 5/2004 | Olivier | |
| 2004/0114101 A1 | 6/2004 | Thakrar | |
| 2004/0119174 A1 | 6/2004 | Hofmann | |
| 2004/0169820 A1 | 9/2004 | Dai | |
| 2004/0169932 A1 | 9/2004 | Esch | |
| 2004/0179167 A1 | 9/2004 | Dahi | |
| 2004/0215525 A1 | 10/2004 | Keane | |
| 2004/0222539 A1 | 11/2004 | Hagmann | |
| 2004/0233382 A1 | 11/2004 | Lindacher | |
| 2004/0246440 A1 | 12/2004 | Andino | |
| 2004/0263776 A1 | 12/2004 | Ezekiel | |
| 2004/0263779 A1 | 12/2004 | Schroder | |
| 2004/0263785 A1 | 12/2004 | Chernyak | |
| 2005/0041203 A1 | 2/2005 | Lindacher | |
| 2005/0056954 A1 | 3/2005 | Devlin | |
| 2005/0060196 A1 | 3/2005 | Tsushi | |
| 2005/0068489 A1 | 3/2005 | Hall | |
| 2005/0073648 A1 | 4/2005 | Toshima | |
| 2005/0074616 A1 | 4/2005 | Harchanko | |
| 2005/0089670 A1 | 4/2005 | Large | |
| 2005/0090612 A1 | 4/2005 | Soane | |
| 2005/0098478 A1 | 5/2005 | Gupta | |
| 2005/0099595 A1 | 5/2005 | Lindacher | |
| 2005/0105044 A1 | 5/2005 | Warden | |
| 2005/0105045 A1 | 5/2005 | Legerton | |
| 2005/0105048 A1 | 5/2005 | Warden | |
| 2005/0122472 A1 | 6/2005 | Fisher | |
| 2005/0131398 A1 | 6/2005 | Campbell | |
| 2005/0219461 A1 | 10/2005 | Hirohara | |
| 2005/0259221 A1 | 11/2005 | Marmo | |
| 2005/0264756 A1 | 12/2005 | Esch | |
| 2005/0275137 A1 | 12/2005 | Stolpe | |
| 2006/0001184 A1 | 1/2006 | Phelan | |
| 2006/0055071 A1 | 3/2006 | Kendig | |
| 2006/0055884 A1 | 3/2006 | Molinari | |
| 2006/0100408 A1 | 5/2006 | Powell et al. | |
| 2006/0173644 A1 | 8/2006 | Dai | |
| 2006/0192310 A1 | 8/2006 | Lindacher | |
| 2006/0192919 A1 | 8/2006 | Lindacher | |
| 2006/0232743 A1 | 10/2006 | Legerton | |
| 2006/0256451 A1 | 11/2006 | Schaack | |
| 2006/0264917 A1 | 11/2006 | Tuan | |
| 2006/0268225 A1 | 11/2006 | Lieberman | |
| 2006/0279696 A1 | 12/2006 | Perez | |
| 2007/0023942 A1 | 2/2007 | Andino | |
| 2007/0038202 A1 | 2/2007 | Celestino | |
| 2007/0091259 A1 | 4/2007 | Svochak | |
| 2007/0097318 A1 | 5/2007 | Chehab | |
| 2007/0103639 A1 | 5/2007 | Nellissen et al. | |
| 2007/0109497 A1 | 5/2007 | Chang | |
| 2007/0132949 A1 | 6/2007 | Phelan | |
| 2007/0260349 A1 | 11/2007 | John et al. | |
| 2007/0273828 A1 | 11/2007 | Polland | |
| 2007/0274626 A1 | 11/2007 | Sabeta | |
| 2007/0284770 A1 | 12/2007 | Ansell | |
| 2007/0285760 A1 | 12/2007 | Ho | |
| 2008/0013043 A1 | 1/2008 | Ye | |
| 2008/0017977 A1 | 1/2008 | Tseng | |
| 2008/0043200 A1 | 2/2008 | Ishak | |
| 2008/0055545 A1 | 3/2008 | Clamp | |
| 2008/0067702 A1 | 3/2008 | Yao | |
| 2008/0079184 A1 | 4/2008 | Yin | |
| 2008/0079895 A1 | 4/2008 | Jubin | |
| 2008/0137030 A1 | 6/2008 | Hoffman | |
| 2008/0143003 A1 | 6/2008 | Phelan | |
| 2008/0143004 A1 | 6/2008 | De Wilt | |
| 2008/0143960 A1 | 6/2008 | MacRae | |
| 2008/0143963 A1 | 6/2008 | Lindacher | |
| 2008/0165324 A1 | 7/2008 | Lindacher | |
| 2008/0179770 A1 | 7/2008 | Rooney | |

(56) References Cited

U.S. PATENT DOCUMENTS

| | | |
|---|---|---|
| 2008/0192201 A1 | 8/2008 | Wengler |
| 2008/0277811 A1 | 11/2008 | Miller |
| 2008/0288369 A1 | 11/2008 | Hunter |
| 2008/0291395 A1 | 11/2008 | Dai |
| 2008/0306573 A1 | 12/2008 | Campin |
| 2008/0309873 A1 | 12/2008 | Levecq |
| 2009/0022274 A1 | 1/2009 | Gertner |
| 2009/0033920 A1 | 2/2009 | Simpson |
| 2009/0051059 A1 | 2/2009 | Widman |
| 2009/0174863 A1 | 7/2009 | Widman |
| 2010/0047380 A1 | 2/2010 | Widman et al. |
| 2012/0075581 A1 | 3/2012 | Hoffman et al. |

FOREIGN PATENT DOCUMENTS

| | | |
|---|---|---|
| EP | 0637471 | 2/1995 |
| EP | 0624811 B1 | 9/1997 |
| EP | 637491 B1 | 11/1997 |
| EP | 1750162 A2 | 2/2007 |
| EP | 1818692 A2 | 8/2007 |
| EP | 1552336 B1 | 10/2008 |
| GB | 1449685 A | 9/1976 |
| JP | 1-198312 | 9/1989 |
| JP | 2001290978 A | 10/2001 |
| JP | 2002078681 A | 3/2002 |
| JP | 2002357796 A | 12/2002 |
| JP | 2003295134 A | 10/2003 |
| RU | 2116891 C1 | 8/1998 |
| WO | 9300816 | 1/1993 |
| WO | 9308016 | 4/1993 |
| WO | 9729441 A1 | 8/1997 |
| WO | 9733742 A1 | 9/1997 |
| WO | 9842497 A2 | 10/1998 |
| WO | 9842497 A3 | 10/1998 |
| WO | 0102881 | 1/2001 |
| WO | 0140846 A3 | 6/2001 |
| WO | 0221753 | 3/2002 |
| WO | 0233628 A2 | 4/2002 |
| WO | WO 03/009052 A1 | 1/2003 |
| WO | 03013832 | 2/2003 |
| WO | 03037716 A2 | 5/2003 |
| WO | 03058287 A2 | 6/2003 |
| WO | 03058287 A3 | 6/2003 |
| WO | 2004015481 | 2/2004 |
| WO | 2004034095 | 4/2004 |
| WO | 2004039554 A2 | 5/2004 |
| WO | 2004022318 A3 | 6/2004 |
| WO | 2004055573 A1 | 7/2004 |
| WO | 2007112306 A1 | 10/2004 |
| WO | 2005005121 A2 | 1/2005 |
| WO | 2005005121 A3 | 1/2005 |
| WO | 2005007386 A2 | 1/2005 |
| WO | 2005007386 A3 | 1/2005 |
| WO | 2005098478 A1 | 10/2005 |
| WO | 2006010632 A1 | 2/2006 |
| WO | WO 2006/013101 A2 | 2/2006 |
| WO | 2006034864 A1 | 4/2006 |
| WO | 2006029281 A3 | 5/2006 |
| WO | 2006047698 | 5/2006 |
| WO | 2009025848 A2 | 2/2009 |
| WO | WO 2009025845 | 2/2009 |

OTHER PUBLICATIONS

Cabral, J.T., et al; Propagating waves of network formation induced by light, Polymer 46 (2005) pp. 4230-4241.

PCT International Search Report, dated May 3, 2010, for PCT Int'l Appln. No. PCT/US2010/022222.

PCT International Search Report, dated Jun. 25, 2010, for PCT Int'l Appln. No. PCT/US2010/025773.

PCT International Search Report, dated Mar. 25, 2009 for PCT Int'l Appln. No. PCT/US2008/009976.

PCT International Search Report, dated Apr. 12, 2008, for PCT Int'l Appln. No. PCT/US2008/009973.

TW Search Report ROC Patent Application No. 99102498 Date of Search Report Jul. 7 2015; Date Johnson & Johnson notified of Search Report Aug. 13, 2015.

* cited by examiner

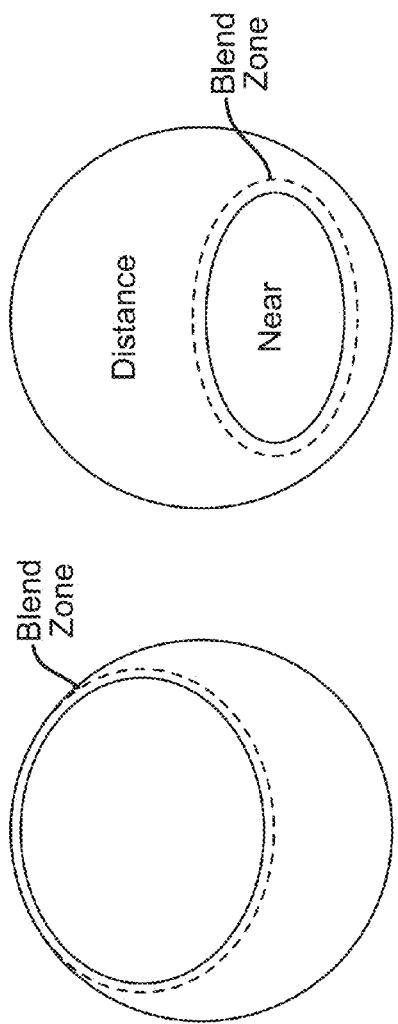
FIG. 3F
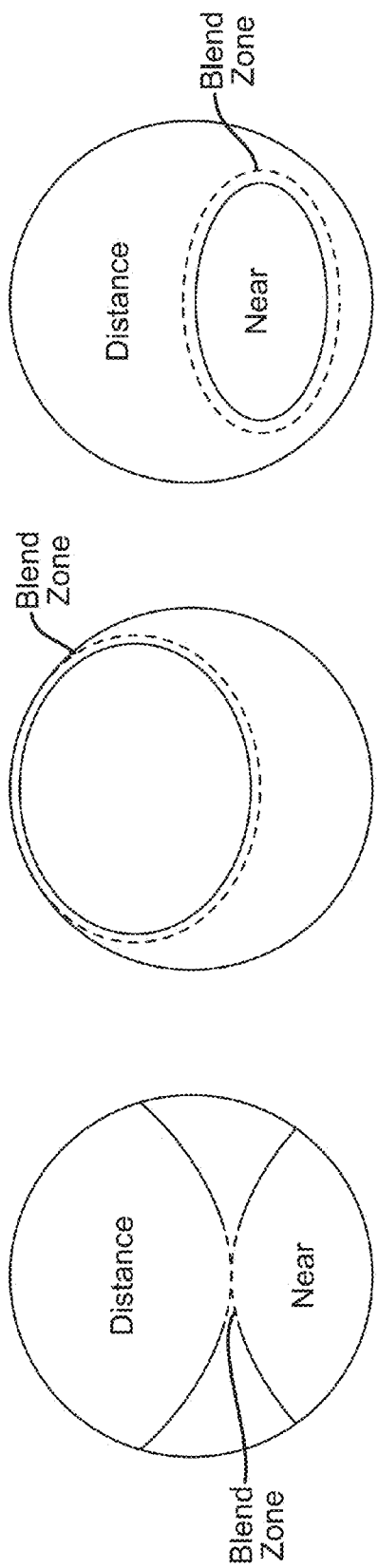
FIG. 3E
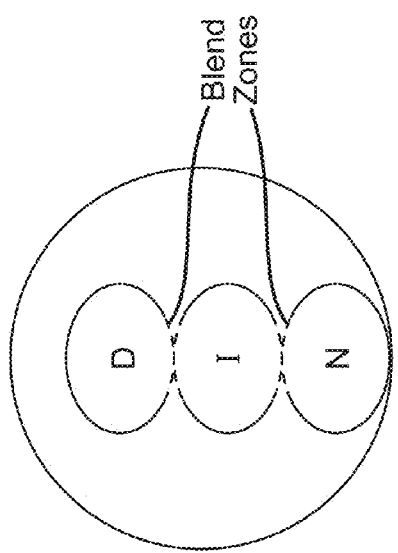
FIG. 3H
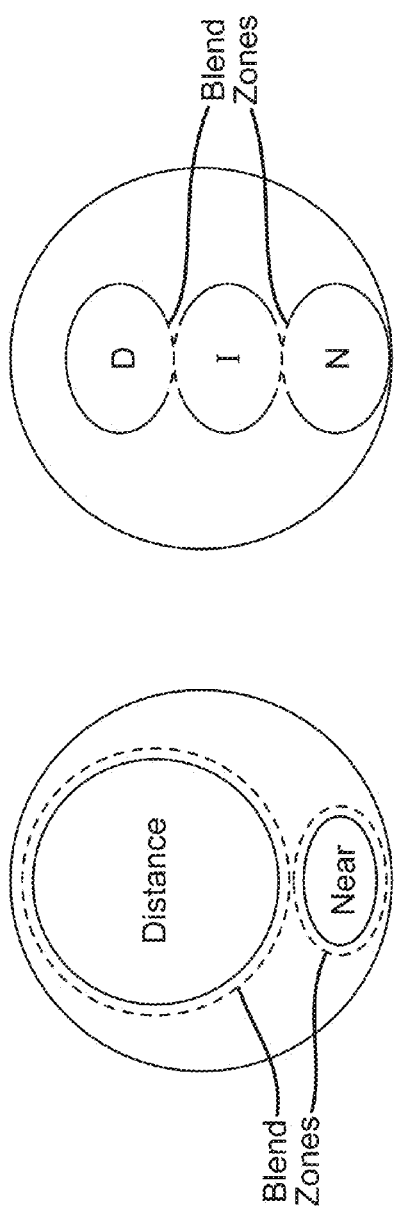
FIG. 3D
FIG. 3G

METHOD AND APPARATUS OF FORMING A TRANSLATING MULTIFOCAL CONTACT LENS HAVING A LOWER-LID CONTACT SURFACE

CROSS REFERENCE TO RELATED APPLICATIONS

The present application claims priority to the U.S. Provisional Application 61/618,022 filed Mar. 30, 2012, which claims priority to Continuation in Part application to U.S. patent application Ser. No. 12/194,981 filed, Aug. 20, 2008 and entitled, "Apparatus for Formation of an Ophthalmic Lens Precursor and Lens" and also as a Continuation in Part application to U.S. patent application Ser. No. 12/195,132 filed, Aug. 20, 2008 and entitled, "Methods for Formation of an Ophthalmic Lens Precursor and Lens" the contents of each are relied upon and incorporated herein by reference.

FIELD OF USE

This invention relates to contact lenses and more specifically, to a translating multifocal contact lens comprising multiple Optic Zones wherein, incorporating a lower-lid contact surface aids in limiting lens movement upon an eye when an eye translates from one Optic Zone to another Optic Zone.

BACKGROUND OF THE INVENTION

Bifocal lenses are comprised of two or more areas, or zones, with different optical powers, including typically a far-power Optic Zone for distance vision, and a near-power Optic Zone for near or close up vision. The two zones may be subdivided into additional power zones in which case a lens may be called a multifocal lens. Previously known multifocal lenses have been limited by known manufacturing apparatus, such as, for example, cast molding, standard lathing or tooling technology, and injection molding technology.

The retinal image and the visual percept that results from it are dependent upon the light that enters an eye through the entrance pupil. In order for a bifocal contact lens to function properly, the entrance pupil must be covered at least partly or, more effectively, completely by the distance-power zone of a lens when an eye observes a distant object, and covered at least partly or, more effectively, completely by a near-power zone of a lens when an eye observes a near object. This function may be accomplished by the principle of alternating vision in which a shifting action or translation of a contact lens is made to occur in order to place one or the other zones in front of the entrance pupil as an eye alternates between viewing distance and near objects.

Alternatively, a principle known as simultaneous vision may be utilized whereby a lens is designed and fitted in such a way as to position part or all of both the far and near-power zones in front of the entrance pupil at the same time so that each contributes to the retinal image simultaneously. There is little or no translation required with this type of lens however, consequently two images are seen simultaneously, compromising vision.

Generally, the two types of conventional bifocal contact lenses are segmented and concentric. Segmented bifocal contact lenses or translating contact lenses, generally have two or more divided optical power zones. A far-power zone is usually the upper zone and a near-power zone is usually the lower zone. With such a translating lens, a far-power zone of a lens is in front of the entrance pupil of an eye in straight-ahead gaze, while in downward gaze, the add power or near-power zone of a lens is over the entrance pupil. Concentric bifocal contact lenses generally have a central power zone and one or more annular power zones that function usually, but not always, by the simultaneous vision principle. It is recognized that these lenses do not provide good vision for both distance and near viewing, and are only worn successfully by those who are willing to accept less than optimal vision.

Effective use of a bifocal contact lens requires translation of an ocular system between vision surfaces when an eye changes from gazing at an object at a distance to gazing at a nearby object. Alternatively, there may be a desire to have a translating multifocal contact lens that may have one or more intermediate-power zones in addition to far- and near-power Optic Zones. Such a translating contact lens may have to have an ability to control and optimize the amount of movement of a lens when the pupil translates from distance vision, to intermediate vision, to near vision, or any combination thereof.

While there are many designs for soft translating contact lenses, soft contact lenses have difficulty translating across the surface of an eye when the visual direction of an eye changes from a straight-ahead gaze, to a downward gaze. In one prior art example, describes a soft bifocal contact lens that has an integrally formed bevel to aid translation of a lens. While other designs may have the capability to translate across the surface of an eye when the visual direction of an eye changes from a straight-ahead gaze, to a downward gaze, but are not very efficient at controlling movement of a lens during an eye's translation to a different visual direction. Another prior art example, describes a soft multifocal contact lens that has an integrally formed ramped ridge zone adjoining an outwardly extending latitudinal ridge that sits on an eyelid to aid in translation of a lens. The latitudinal ridge portion has a bump at each end, thereby increasing elevation height of the ends of the ridge compared to the elevation height in the middle. Another disadvantage of the prior art is discomfort when worn upon an eye.

Therefore, there is a need for a soft translating multi-focal contact lens that is capable of limiting the amount of translation across the surface of an eye when an eye changes position from distance vision to near vision, and provides wearers with improved comfort. There is also a need for a soft translating multi-focal contact lens that can limit the amount of translation across the surface of an eye when an eye changes position from distance vision, to intermediate vision, to near vision and improves optical efficiency.

SUMMARY

Accordingly, one aspect of this invention provides a translating multifocal contact lens resulting in limited lens translocation relative to the pupil of an eye. The limited translocation may be based upon one or both of vertical stability and rotational stability when using near, intermediate, and distance vision. In some embodiments of the present invention, components may include, for example, one or more of: an anterior surface, a posterior surface, an optical-power region, a Lens Edge, Stabilization Zones, a peripheral region, a center, and a lower-lid contact surface. More specifically, the present invention discloses a translating multifocal contact lens including a lower-lid contact surface. Free-form technology enables many previously unobtainable shapes and forms including non-spherical. The voxel by voxel formation essentially, allows for a great variety of shapes formable on a substrate.

BRIEF DESCRIPTIONS OF DRAWINGS

FIGS. 3A-3H illustrate examples of multiple variations of different types, shapes, and arrangements of Optic Zones that may occur in an optical-power region.

DETAILED DESCRIPTION OF INVENTION

Figure 1A:
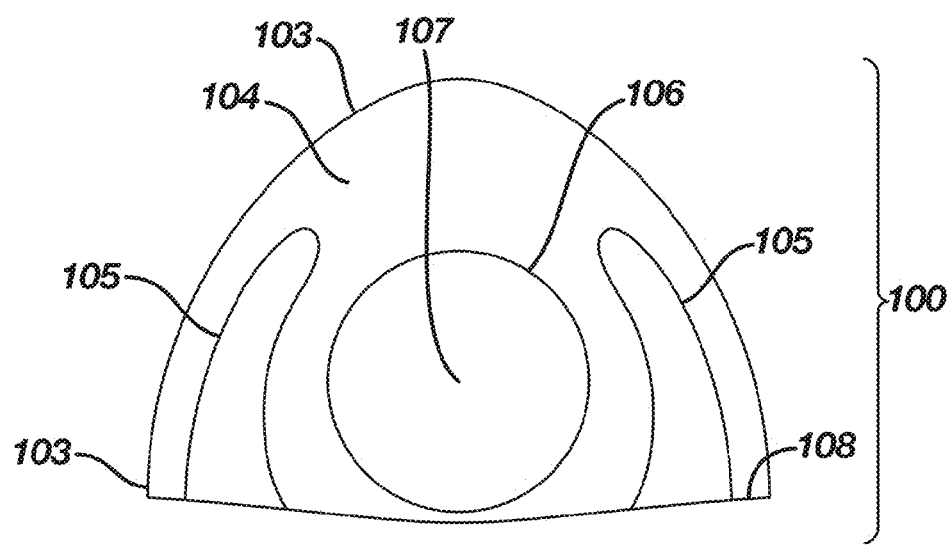
FIG. 1A illustrates a front plan view of a translating multifocal contact Lens containing multiple features.

The present invention provides for a translating multifocal contact lens comprising a lower-lid contact surface, in accordance with a particular patient's eye data and method steps and apparatus for implementing the same. A preferred embodiment of the present invention includes a Free-formed, translating multifocal contact lens, as is discussed more fully below in relation to the various figures.

In the following sections, detailed descriptions of embodiments of the invention are given. The description of both preferred and alternative embodiments though thorough are exemplary embodiments only, and it is understood to those skilled in the art that variations, modifications and alterations may be apparent. It is therefore to be understood that said exemplary embodiments do not limit the broadness of the aspects of the underlying invention. Method steps described herein are listed in a logical sequence in this discussion. However, this sequence in no way limits the order in which they may be implemented unless specifically stated. In addition, not all of the steps are required to implement the present invention and additional steps may be included in various embodiments of the present invention.

GLOSSARY

In this description and claims directed to the presented invention, various terms may be used for which the following definitions will apply:

"Blend Zone" as used herein means a contiguous area that blends a portion of a lens to another adjoining portion of a lens.

"DMD Show" as used herein, refers to a collection of time based instructional data points that may be used to control activation of mirrors on a DMD, and enable a Lens or Lens Precursor or Lens Precursor Form or Lens Precursor Feature(s) to be fabricated. A DMD Show may have various formats, with (x,y,t), and (r, θ, t) being the most common where, for example "x" and "y" are Cartesian coordinate locations of DMD mirrors, "r" and "θ" are Polar coordinate locations of DMD mirrors, and "t" represents time instructions controlling DMD mirror states. DMD Shows may contain data associated with a regularly or irregularly spaced grid.

"Fluent Lens Reactive Media" as used herein means a Reactive Mixture that is flowable in either its native form, reacted form, or partially reacted form and, a portion or all Reactive Media may be formed upon further processing into a part of an ophthalmic lens.

"Free-form" as used herein "free-formed" or "free-form" refers to a surface that is formed by crosslinking of a Reactive Mixture via exposure to actinic radiation on a voxel by voxel basis, with or without a fluent media layer, and is not shaped according to a cast mold, lathe, or laser ablation. Detailed description of Free-form methods and apparatus are disclosed in U.S. patent application Ser. No. 12/194,981 (VTN5194USNP) and in U.S. patent application Ser. No. 12/195,132 (VTN5194USNP1).

"Lens" as used herein "lens" refers to any ophthalmic device that resides in or on the eye. These devices may provide optical correction or may be cosmetic. For example, the term lens may refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

"Lens Design" as used herein, refers to form, function or both of a desired Lens, which if fabricated, may provide optical power correction, acceptable Lens fit (e.g., corneal coverage and movement), acceptable Lens rotation stability, etc. Lens Designs may be represented in either a hydrated or un-hydrated state, in Flat or Curved Space, in 2-dimensional or 3-dimensional space, and by a method including but not limited to, geometric drawings, power profile, shape, features, thicknesses etc. Lens Designs may contain data associated with a regularly or irregularly spaced grid.

"Lens Edge" as used herein, refers to a feature to provide a well-defined edge around a perimeter of a Lens Precursor or a Lens that may contain Fluent Lens Reactive Media. A Lens Edge feature may be either continuous around a Lens Precursor or a Lens, or may be present in discrete, non-continuous zones.

"Lens Precursor" as used herein, means a composite object consisting of a Lens Precursor Form and Fluent Lens Reactive Media in contact with a Lens Precursor Form that may be rotationally symmetrical or non-rotationally symmetrical. For example, in some embodiments Fluent Lens Reactive Media may be formed in the course of producing a Lens Precursor Form within a volume of Reactive Mixture. Separating a Lens Precursor Form and Fluent Lens Reactive Media from a volume of Reactive Mixture used to produce a Lens Precursor Form may generate a Lens Precursor. Additionally, a Lens Precursor may be converted to a different entity by either the removal of an amount of Fluent Lens Reactive Media or the conversion of an amount of Fluent Lens Reactive Media into non-fluent incorporated material.

"Lens Precursor Feature", also referred to as "feature", as used herein, refers to a non-fluent substructure of a Lens Precursor Form, and acts as an infrastructure for a Lens Precursor. Lens Precursor Features may be defined empirically or described mathematically by control parameters (height, width, length, shape, location, etc.,) may be are fabricated via DMD Show instructions. Examples of Lens Precursor Features may include one or more of the following: A Lens Edge feature, a Stabilization Zone feature, a Smart Floor Volumator feature, an Optic Zone feature, a Moat feature, a Drain Channel feature, etc. Lens Precursor Features may be fabricated using Actinic Radiation Voxels and may be incorporated into an ophthalmic Lens upon further processing.

"Minimal Energy Surface" as used herein, or the term "MES", refers to a free-formed surface created by Fluent Lens Reactive Media formed over Lens Precursor Features, which may be in a minimum energy state. Minimal Energy Surfaces may be smooth and continuous surfaces.

"Optic Zone" as used herein, refers to a feature that provides one or both of a desired optical power and aberration correction of a Lens Precursor or ophthalmic Lens, the geometry of which may be directly dependent on a Target File.

"Reactive Mixture" as used herein, may be interchangeably used with "Lens Forming Mixture"; lens-forming monomer; refers to a monomer or prepolymer material which can be cured and/or crosslinked to form an ophthalmic lens or portion of an ophthalmic lens. Various embodiments can include lens-forming mixtures with one or more additives such as: UV blockers, tints, photoinitiators, or catalysts, and other additives one might desire in an ophthalmic lenses such as, contact or intraocular lenses.

"Stabilization Zone" as used herein, refers to a feature that may assist in keeping non-rotationally symmetric contact Lenses correctly oriented on an eye and may be found inboard of a Lens Edge feature and outboard of one or both of an optical-power region and an Optic Zone feature.

"Target File", as used herein, refers to data that may represent a Lens Design, a Thickness Map, a Lens Precursor design, a Lens Precursor Form design, a Lens Precursor Feature design, or combinations of the above. A Target File may be represented in either a hydrated or un-hydrated state, in Flat or Curved Space, in 2-dimensional or 3-dimensional space, and by methods including but not limited to, geometric drawings, power profile, shape, features, thicknesses etc. Target Files may contain data associated with a regularly or irregularly spaced grid.

In some embodiments of this invention, a patient's eye measurement data may be obtained utilizing various types of clinical vision equipment and may be used to influence parameters such as, for example, size, shape, amount, and location of physical features that may include a translating multifocal contact lens. In some embodiments, physical features included in a lens may be functionally important to aid in lens comfort and fit when upon an eye. Additionally, physical features may be functionally important to aid in one or both of vertical stability and rotational stability by limiting movement of a lens when a pupil's line of sight moves from one Optic Zone to another Optic Zone. In some embodiments, a translating multifocal contact lens may include one or more of: an anterior surface, a posterior surface, a Lens Edge, a peripheral region, Stabilization Zones, an optical-power region, a center, and a lower-lid contact surface.

Figure 1B:
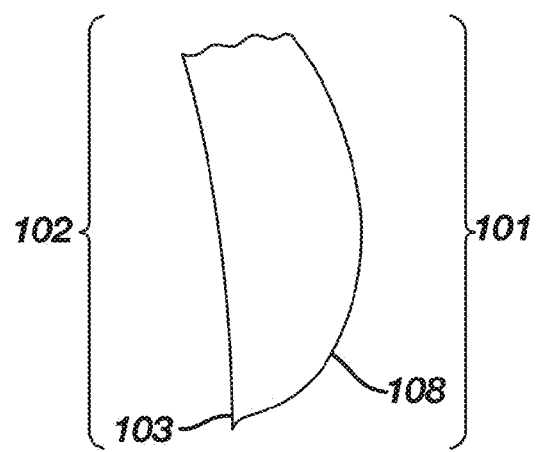
FIG. 1B illustrates a side view of anterior and posterior surfaces of a translating multifocal contact Lens.

Referring now to FIGS. 1A, and 1B. In FIG. 1A, a front plan view of an anterior surface 101 of a translating multifocal contact Lens 100 containing multiple features is illustrated. In FIG. 1B, a side view of an anterior surface 101 and a posterior surface 102 of a translating multifocal contact lens 100 is illustrated. In some embodiments, a contact lens 100 may include, for example, an anterior surface 101, a posterior surface 102, a Lens Edge 103, a peripheral region 104, Stabilization Zones 105, an optical-power region 106, a center 107, and a lower-lid contact surface 108.

In some embodiments, an anterior surface 101 may include one or more of, for example, an optical-power region 106, a peripheral region 104, and a Lens Edge 103. In some embodiments, a lens 100 may include a variety of round and non-round geometric shapes, for example, one or more of spherical, non-spherical, toroidal, and freeform. In yet, some other embodiments, an optical-power region 106 may include for example, a variety of round and non-round geometric shapes and be centrally located, inside of a peripheral region 104 of a lens 100. A peripheral region 104 may extend radially from an outer edge of an optical-power region 106 to a Lens Edge 103. A Lens edge 103 may extend radially from an outer edge of a peripheral region 104 to where an anterior surface 101 and a posterior surface 102 of a lens 100 meet each other and operates as a perimeter, as it goes around an entire circumference of a lens 100.

In some other preferred embodiments, an anterior surface 101 may include one or more of, for example, a Stabilization Zone 105, and a lower-lid contact surface 108. Incorporation of a lower-lid contact surface 108 into a translating multifocal contact lens 100 provides for a large area of lower eyelid contact, and for one or both of vertical stability and rotational stability. In some embodiments, for example, a Stabilization Zone 105 may be present on one or both sides of an optical-power region 106. Furthermore, a Stabilization Zone 105 may also provide for one or both of vertical stability and rotational stability for a lens 100. In addition, a Stabilization Zone 105, an under-lid support structure 109, and a lower-lid contact surface 108 may be contoured to aid in lens 100 comfort and lens 100 fit.

In yet, some other additional embodiments, a posterior surface 102 may include, for example, a peripheral region 104, and an optical-power region 106 including one or more multiple Optic Zones, which may contribute to relevant powers of a contact lens 100. In some embodiments, a posterior surface 102 may include, for example, one or both of a peripheral region 104 and an optical-power region 106 including one or more of a far-power Optic Zone, an intermediate-power Optic Zone, and a near-power Optic Zone. In some additional embodiments, a posterior surface 102 may include, for example, one or both of a peripheral region 104 and an optical-power region 106 including one or both of a far-power Optic Zone and a near-power Optic Zone.

Figure 2A:
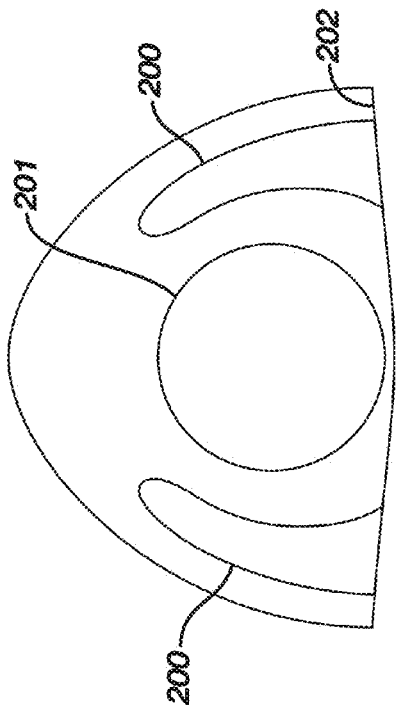
FIGS. 2A-2D illustrate examples of multiple variations of Stabilization Zone location, and occurrence that are possible with the present invention.
Figure 2B:
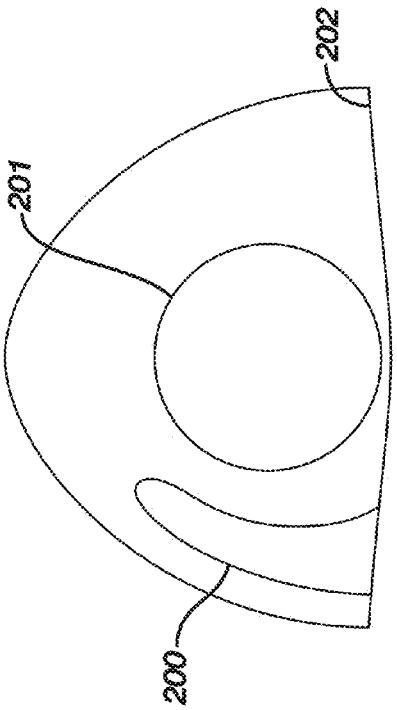
Figure 2C:
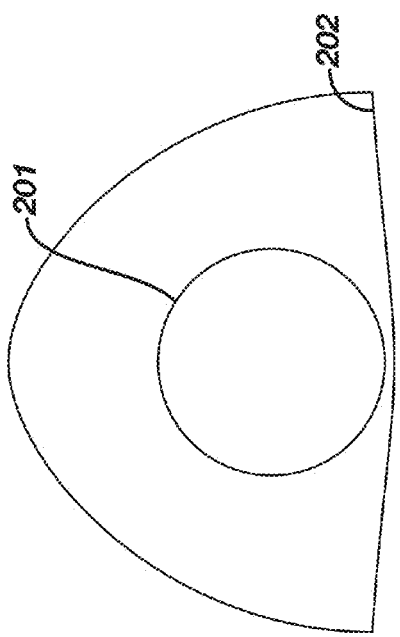
Figure 2D:
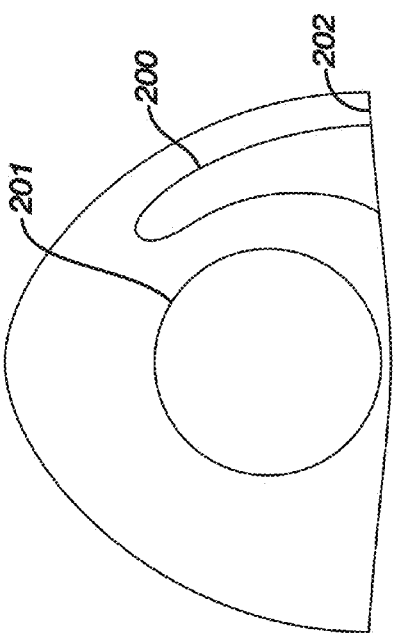

Referring now to FIGS. 2A-2D, illustrate examples of multiple variations of Stabilization Zone 200 location, and occurrence that may fall within the present invention. In some embodiments, a lens may include one or multiple of Stabilization Zones 200 to provide for one or both of vertical stability and rotational stability when upon an eye. Furthermore, a Stabilization Zone 200 may include a variety of geometric shapes defined by one or both of points and lines with at least one curve to define a surface, which may also aid in improved wearer comfort. In some embodiments, for example, a lens may include one Stabilization Zone 200 that may occur on one of either a right side of an optical-power region 201, (as seen in FIG. 2C), or that may occur on a left side of an optical-power region 201, (as seen in FIG. 2D). In yet other embodiments, for example, a lens may not include Stabilization Zones 200 (as seen in FIG. 2A), or a lens may include at least two or more Stabilization Zones 200 (as seen in FIG. 2B).

In some embodiments, Stabilization Zones 200 may include an arced segment of hydrogel material with an angular width between 0° to 180° that may extend from a top edge of an optical-power region 201 to a top edge of a lower-lid contact surface 202. In addition, a Stabilization Zone 200 may include a width (w) of 5 mm or less that extends radially from a center of a lens, and an axial peak height (ht) of 1 mm or less that extends vertically from a base of a Stabilization Zone 200. In a preferred embodiment, a Stabilization Zone 200 may include, for example, an angular width of 124°, a w of 3 mm and a ht of 0.5 mm.

Referring now to FIGS. 3A-3H, illustrate examples of multiple variations of different types, shapes, and arrangements of Optic Zones that may occur within an optical-power region. An Optic Zone may include a variety of geometric shapes defined by one or both of points and lines with at least one curve to define a surface. In some embodiments an optical-power region may include multiple Optic Zones, such as, for example, one or more of a far-power Optic Zone for distance vision, an intermediate-power Optic Zone for intermediate vision, and a near-power Optic Zone for close-up or near vision. In some other embodiments, for example, a far-power Optic Zone, an intermediate-power Optic Zone, and a near-power Optic Zone may occur in descending order that may occur by going from top to bottom of an optical-power region.

Figure 3A:
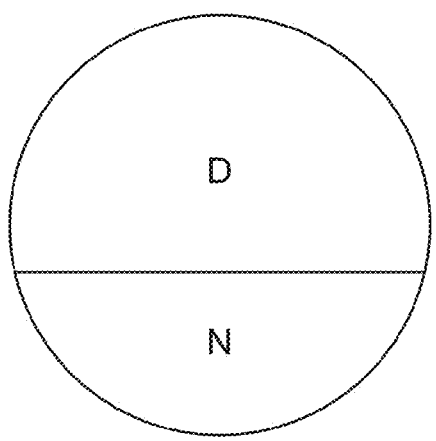
Figure 3B:
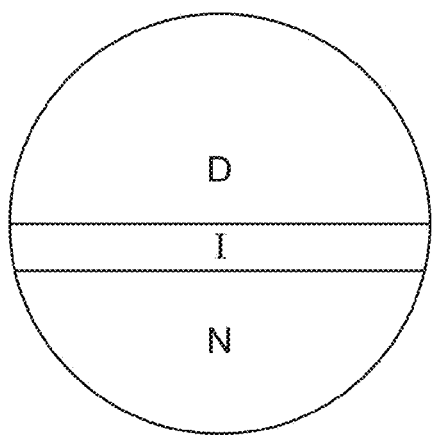
Figure 3C:
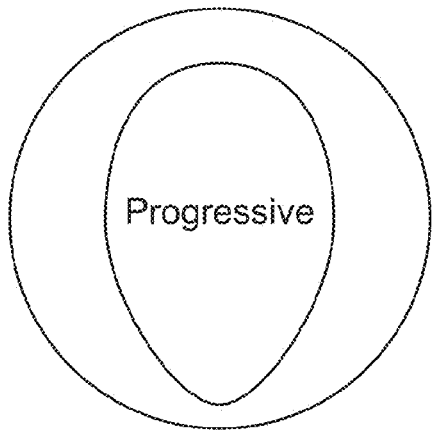

Some additional embodiments include, for example, Optic Zones that may occur as one or more of split-Optic Zones FIGS. 3A and 3B, progressive Optic Zones FIG. 3C, and blended Optic Zones FIGS. 3D-3H. In some embodiments, for example, a Blend Zone may include a contiguous area blending an Optic Zone FIGS. 3D-3H to another adjoining portion of a lens including one or more of an Optic Zone, a peripheral region, and a lower-lid contact surface. A progressive lens as illustrated in FIG. 3C, includes multiple Optic Zones formed across a continuum, as opposed to discrete zones.

In another aspect of the present invention, a lower-lid contact surface may be include a contiguous, inward extension of an anterior surface portion that extends laterally across an entire anterior lens surface thereby, providing a shelf-like structure that may rest on a lower eyelid. In some embodiments, a lower-lid contact surface may be located directly above an adjoining Lens Edge. Furthermore, a lower-lid contact surface may include a variety of geometric shapes defined by one or both of points and lines with at least one curve to define a surface. Accordingly, in some embodiments, a lower-lid contact surface may be contoured to an exact shape of a patient's lower eyelid that may provide for one or more of a better fit, wearer comfort, vertical stability, rotational stability, and limiting an amount of lens translocation when a wearer changes line of sight from one Optic Zone to another.

Figure 4:
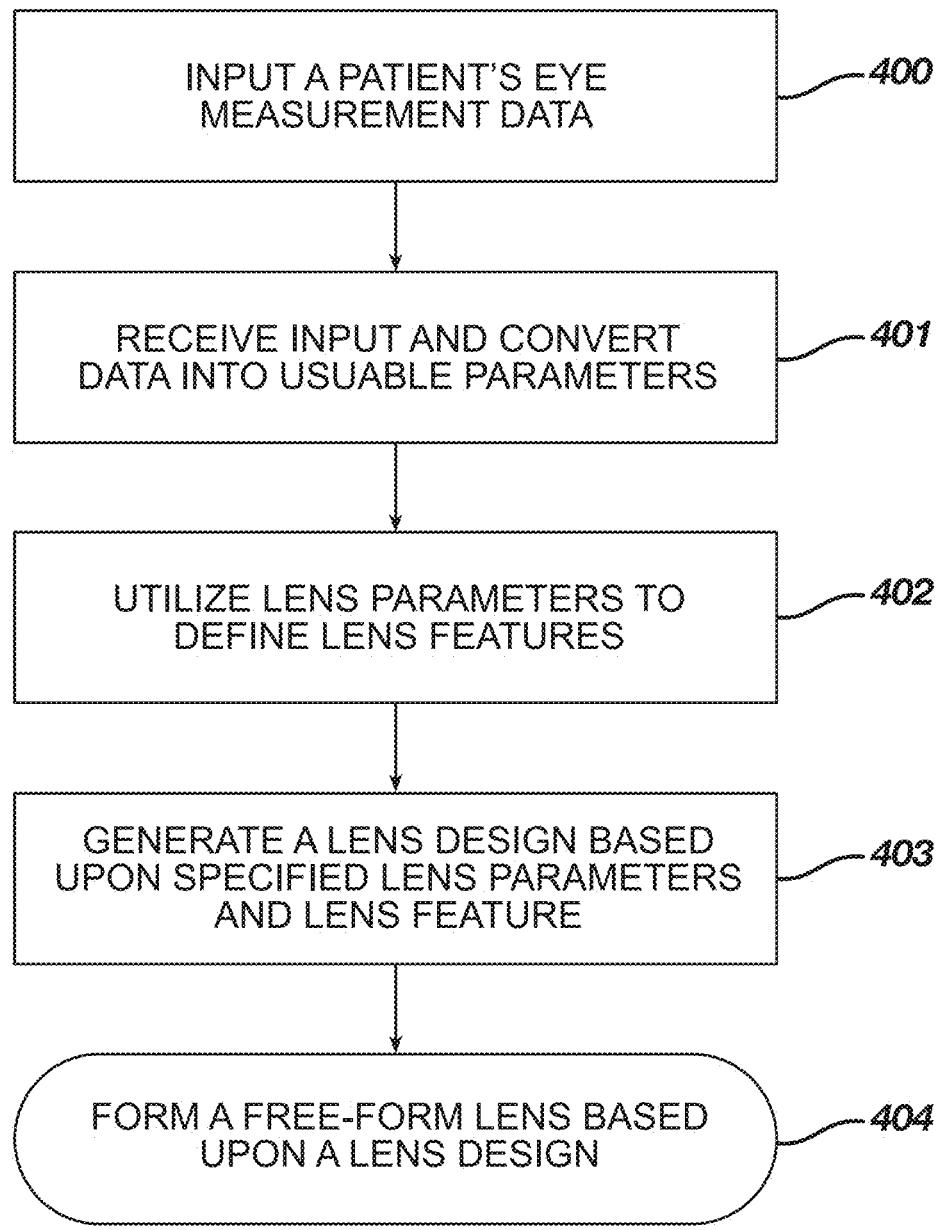
FIG. 4 illustrates method steps according to some additional aspect of the present invention.

Alternatively, in some additional aspects of the present invention, referring now to FIG. 4, illustrates method steps that may be implemented to form a translating multifocal contact lens. In some embodiments, patient data may be used to implement formation of a translating multifocal contact lens. In one example, eye data may be obtained from various ocular measurement devices such as topographers, wavefront devices, microscopes, video cameras, etc., and the data subsequently stored in various embodiments. In another example, an eye may be examined in various lighting conditions, such as: low, intermediate, and bright lighting conditions, in which any data obtained may be stored in various embodiments.

In some embodiments, different types of eye data obtained may include, for example, eye shape; lower-lid position relative to an upper-lid, a pupil, and a limbus; pupil, and limbus size, shape, and location at near viewing, intermediate viewing, and distance viewing; and lower-lid radius of curvature, and distance from pupil center. In one example, data obtained from a patient's eye may influence features of this invention such as, a shape of a Lens; shape, size, location, and amount of Stabilization Zones present; shape, size, location, and amount of Optic Zones present; and shape, size, and location of a lower-lid contact surface, and an under-lid support structure of a Lens.

At 400, a patient's eye measurement data may be input into various embodiments. At 401, once received, a patient's eye measurement data may be converted by algorithms into usable lens parameters. At 402, lens parameters may be utilized to define lens features included in a lens. At 403, a Lens Design may be generated based upon specified lens parameters and lens features. For exemplary purposes, a Lens Design of a lens surface may be based upon parameter data acquired from one or more ocular measurement devices applied to a patient's eye. In some embodiments, for example, size, shape, and location an optical-power region of a Lens Design may be determined by a patient's pupil movement in various gaze directions. In some other embodiments, for example, shape and location of a lower-lid contact surface may be governed by a patient's lower-lid position and movement. At 404, a Free-form lens may be created based upon a generated Lens Design.

Figure 5:
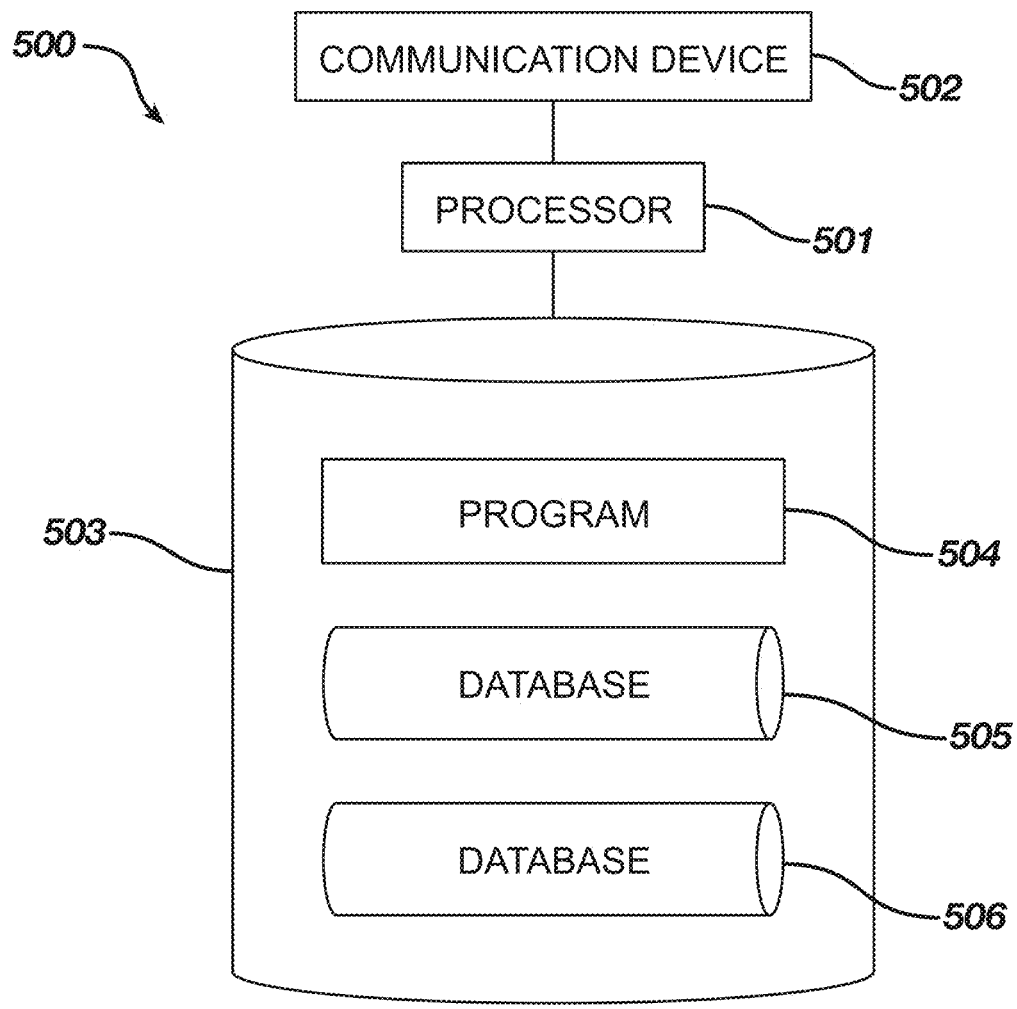
FIG. 5 illustrates a processor that may be used to implement some embodiments of the present invention.

Referring now to FIG. 5, illustrates a controller 500 that may be used to implement some aspects of the present invention such as, for example, the aforementioned method steps. A processor unit 501, which may include one or more processors, coupled to a communication device 502 configured to communicate via a communication network. The communication device 502 may be used to communicate, for example, with one or more controller apparatus or manufacturing equipment components.

A processor 501 may also be used in communication with a storage device 503. A storage device 503 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

A storage device 503 may store an executable software program 504 for controlling a processor 501. A processor 501 performs instructions of a software program 504, and thereby operates in accordance with the present invention. For example, a processor 501 may receive information descriptive of a patient's eye data. A storage device 503 may also store ophthalmic related data in one or more databases 505 and 506. A database may include customized Lens Design data, metrology data, and defined lens parameter data for specific Lens Designs.

CONCLUSION

The present invention, as described above and as further defined by the claims below, provides method steps of forming a Free-form translating multifocal contact lens and apparatus for implementing such methods, as well as the lenses formed thereby. In some embodiments, a Free-form translating multifocal contact lens formed that may include a lower-lid contact surface.

What is claimed is:

1. A translating multifocal contact lens comprising:
an anterior surface comprising an arcuate shape;
a posterior surface comprising an arcuate shape, wherein said posterior surface is opposite of said anterior surface and wherein said posterior surface and said anterior surface meet each other at a Lens Edge;
an optical-power region to provide vision correction for an eye of a user wherein said optical-power region comprises multiple Optic Zones; and
first and second non-contiguous Stabilization Zones positioned external to and on opposite lateral sides respectively of the optical-power region to provide for both vertical stability for the lens and rotational stability for the lens, the first and second Stabilization Zones each extending in a longitudinal direction between a first end substantially adjacent to a lower portion of the Lens Edge that extends beneath the optical-power region and a second end located above the center of the optical-power region, wherein the first end is wider than the second end;
wherein the first end of the first and second Stabilization Zones forms a lower-lid contact surface that limits the amount of lens translocation upon the eye of the user when the user changes direction of vision and the user's line of sight moves from at least one Optic Zone to another said Optic Zone to thereby provide vertical stability for the lens;

wherein said contact lens is a free form lens.

2. The translating contact lens of claim 1 wherein the Stabilization Zone comprises a geometric shape defined by one or both of points and lines with at least one curve to define a surface.

3. The translating contact lens of claim 1 wherein the Stabilization Zone comprises an arced segment of hydrogel material with an angular width between 0° to 180°.

4. The translating contact lens of claim 1 wherein the Stabilization Zone comprises a width (w) of 5 mm or less, and a peak height (ht) of 1 mm or less.

5. The translating contact lens of claim 1 wherein the optical-power region comprises a spherical boundary shape.

6. The translating contact lens of claim 1 wherein the optical-power region comprises a non-spherical boundary shape.

7. The translating contact lens of claim 1 wherein the optical-power region comprises one or more of a far-power Optic Zone, an intermediate-power Optic Zone, and a near-power Optic Zone.

8. The translating contact lens of claim 7 wherein at least one said Optic Zone comprises a geometric shape defined by one or both of points and lines with at least one curve to define a surface.

9. The translating contact lens of claim 1 wherein the lower-lid contact surface comprises a contiguous, inward extension of the anterior surface portion that extends laterally across said anterior lens surface.

10. The translating contact lens of claim 9 wherein the lower-lid contact surface comprises a geometric shape defined by one or both of points and lines with at least one curve to define a surface.

* * * * *